UNITED STATES PATENT OFFICE.

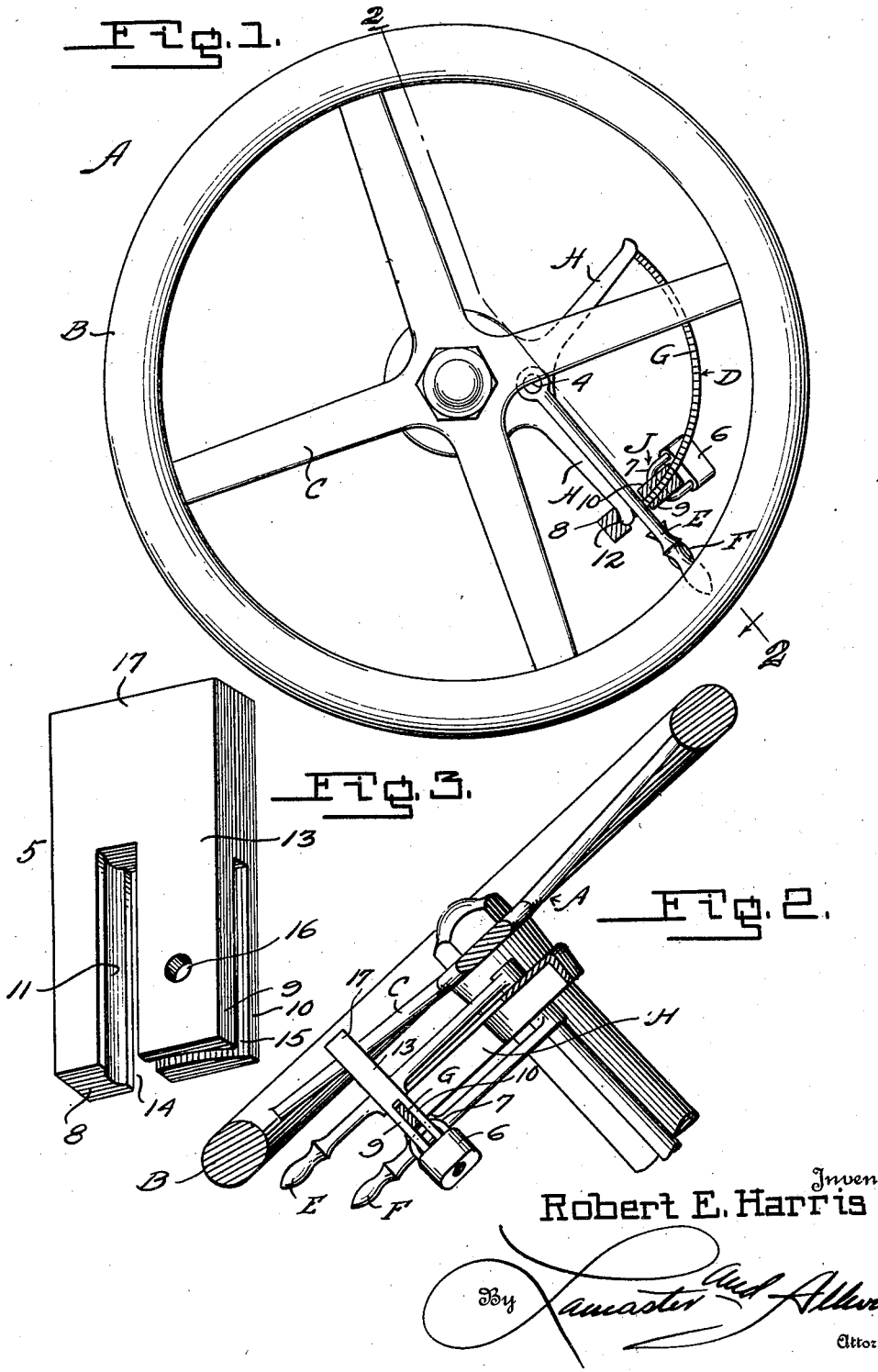

ROBERT E. HARRIS, OF EL PASO, TEXAS.

LOCKING DEVICE FOR MOTOR-VEHICLES.

1,376,876.  Specification of Letters Patent.  Patented May 3, 1921.

Application filed October 14, 1920. Serial No. 416,985.

*To all whom it may concern:*

Be it known that I, ROBERT E. HARRIS, a citizen of the United States, residing at El Paso, in the county of El Paso and State of Texas, have invented certain new and useful Improvements in Locking Devices for Motor-Vehicles, of which the following is a specification.

The present invention relates to locking devices for motor vehicles such as automobiles, trucks, etc., and is more specifically intended for use in connection with the steering wheels and control levers thereof.

The principal object of the invention is to provide a simple and efficient locking device which is particularly well adapted for use on those motor vehicles having the throttle and spark levers below the steering wheel and movable with respect to a quadrant which is oblong in cross section and the levers engaging the narrow edges of the same. The present invention is a specific adaptation of the principle of locking devices more fully set forth in my copending application for patent filed October 14, 1920, Serial #416,984.

Other objects and advantages of the invention will appear in the following detailed description of this specification and of which the accompanying drawing forms a part.

In said drawing:

Figure 1 is a plan view of a steering wheel control levers and quadrant equipped with a locking device formed according to the principle of my invention, the locking device being shown in section to more fully disclose details.

Fig. 2 is a sectional view on the line 2—2 of Fig. 1.

Fig. 3 is a perspective view of the locking device, as an article of manufacture, the padlock not being connected therewith.

Similar characters referring to similar parts throughout the views, A designates a steering wheel including a rim B and spokes C which may be of any approved construction; D a control device including throttle lever E, spark lever F, and quadrant G including radial arms H, the quadrant being of band like formation with the levers E and F engaging the edges of the quadrant; and J the locking device.

In an assembly such as is disclosed there is considerable distance between the quadrant G and the pivotal axis 4 of levers E and F, and hence it is desirable to provide a locking device which cannot be shifted longitudinally of that radial arm H, which is next adjacent the levers E and F when the latter are in closed and retard positions, respectively.

With this end in view, the locking device embodying a body 5 and a lock 6, such as an ordinary pad lock having a shackle 7, is so arranged that projections or fingers 8, 9 and 10 of the body 5 embrace the quadrant G, its arm H and the levers E and F, the finger 8 being provided with a longitudinal groove 11 at its face which confronts fingers 9 and 10, this groove 11 receiving a lateral projection 12 on quadrant arm H and prevents the body 5 from being shifted laterally of quadrant G.

The fingers 8, 9 and 10 extend from one side of an intermediate portion 13 in grouped spaced relation providing intersecting ways 14 and 15 open at one end of body 5. The way 15 is preferably arcuate to closely engage and conform to the shape of the quadrant G which it receives, and the fingers 9 and 10 defining this way 15, are provided with transverse ways or apertures 16 for the reception of the shackle 7 of lock 6. A projection 17 at the other side of intermediate portion 13 is provided to extend between the spokes C of wheel A when the locking device is in place and limit the amplitude of circumferential movement of said wheel.

When applying the locking device, the throttle and spark levers E and F are first moved to a closed and retarded position, respectively, that is, closely adjacent the lower radial arm H of the quadrant G and the body 5 is then slipped into place, by a downward movement. The finger 8 is disposed outside of the quadrant with the projection or bulge 12 in groove 11, and the fingers 9 and 10 straddle the quadrant. The way 14 is wide enough to receive the quadrant arm H and the levers E and F without any material play and the way 15 receives an arcuate portion of the quadrant G without any material play. The ways or apertures 16 are disposed at a distance from the end of way 15 so as to dispose the lock shackle 7 in close proximity below the quadrant. Way 14 is preferably longer than way 15, inasmuch as it receives the lever E which rides upon the quadrant G.

It is to be noted that, when the locking device is in place the levers E and F cannot be moved to feed gas or advance the spark for efficient running of the engine. The steering wheel is limited in its amplitude of circumferential movement by projection 17 between spokes C and hence the vehicle cannot be steered or towed in a normal path of travel, yet the vehicle may be moved from a place of danger, such as from in front of a burning building by manually moving the vehicle back and forth and manipulating the steering wheel through its limited arc. The body 5 cannot be slipped longitudinally of quadrant arm H since finger 9 and projection 12 will prevent such.

While I have herein disclosed and described the way 15 as preferably arcuate, in manufacture it may be desirable to make this straight. Such will not however depart from the principle of the invention since even if there is slight play between the quadrant G and fingers 9 and 10, if the way 14 is made substantially the width of the quadrant arm H and lever E and F, the projection or bulge 12 on the side of the quadrant arm will prevent swinging movement of the finger 8 therefrom.

I claim:

1. A locking device comprising in combination, a relatively flat elongated body formed with three parallel fingers grouped and separated to provide two intersecting ways open at one end of the body, one of said ways relatively longer than the other and the fingers bounding the shorter way having transverse apertures, and a lock including an element extending through said apertures and across the shorter of said ways.

2. A locking device comprising in combination, a relatively flat elongated body formed with three parallel fingers grouped and separated to provide two intersecting ways open at one end of the body, two of said fingers provided with alined transverse apertures, and a lock including an element extending through said apertures and across the way bounded by said fingers.

3. A locking device comprising in combination, a relatively flat elongated body formed with three parallel fingers grouped and separated to provide two intersecting ways open at one end of the body, and a lock carried by two of said fingers and including a removable element traversing the way bounded by the said fingers.

4. As an article of manufacture, a locking device for motor vehicles formed of a single body of material having an intermediate portion, three fingers extending from one side of said intermediate portion in grouped spaced apart relation providing two intersecting ways open at one end of the body one of said ways for the reception of the quadrant section, its supporting arm and control lever of the vehicle, and the other way for the reception of a section of the quadrant, the fingers bounding said last mentioned way provided with alined transverse apertures for the reception of the shackle of a padlock, and a single extension at the other side of said intermediate portion adapted to extend between the spokes of the vehicle steering wheel.

5. As an article of manufacture, a locking device for motor vehicles formed of a single body of material having an intermediate portion, three fingers extending from one side of said intermediate portion in grouped spaced apart relation providing two intersecting ways open at one end of the body one of said ways for the reception of the quadrant section, its supporting arm and control lever of the vehicle, and the other way for the reception of a section of the quadrant, the fingers bounding said last mentioned way provided with alined transverse apertures for the reception of the shackle of a padlock.

6. In a locking device, the combination with a motor vehicle steering wheel having spokes and a throttle lever, a spark lever, and a quadrant having a radial arm for support below said wheel, of a body having an upstanding portion disposed between the spokes of said wheel to limit the amplitude of circumferential movement thereof, and three fingers extending downwardly, one of said fingers engaging the quadrant supporting arm at the outside thereof, and the other two fingers embracing the quadrant and engaging said throttle and spark levers at their sides opposite to said quadrant supporting arm, said last mentioned fingers provided with alined transverse apertures, and a lock including an element extending through said apertures to prevent unauthorized removal of said fingered body.

7. In a locking device, the combination with a motor vehicle steering wheel having spokes and a throttle lever, a spark lever and a quadrant having a radial arm for support below said wheel, said arm provided with a lateral projection at its juncture with the quadrant, of a body having an upstanding portion disposed between the spokes of said wheel to limit the amplitude of circumferential movement thereof and three fingers extending downwardly, one of said fingers engaging the quadrant supporting arm at the outside thereof, and provided with a groove receiving said projection of said quadrant arm, and the other two fingers embracing the quadrant and engaging said throttle and spark levers at their sides opposite to said quadrant supporting arm, said last mentioned fingers provided with alined transverse apertures, and a lock including an element extending through said apertures to prevent unauthorized removal of said fingered body.

8. In a locking device, the combination with a motor vehicle steering wheel having spokes and a throttle lever, a spark lever, and a quadrant having a radial arm for support below said wheel, of a body having an upstanding portion disposed between the spokes of said wheel to limit the amplitude of circumferential movement thereof, and three fingers extending downwardly, one of said fingers engaging the quadrant supporting arm at the outside thereof, and the other two fingers having their confronting faces one concave and the other convex to provide an arcuate way for receiving a section of the quadrant and engaging said throttle and spark levers at their sides opposite to said quadrant supporting arm, said last mentioned fingers provided with alined transverse apertures, and a lock including an element extending through said apertures to prevent unauthorized removal of said fingered body.

ROBERT E. HARRIS.